Patented Mar. 6, 1923.

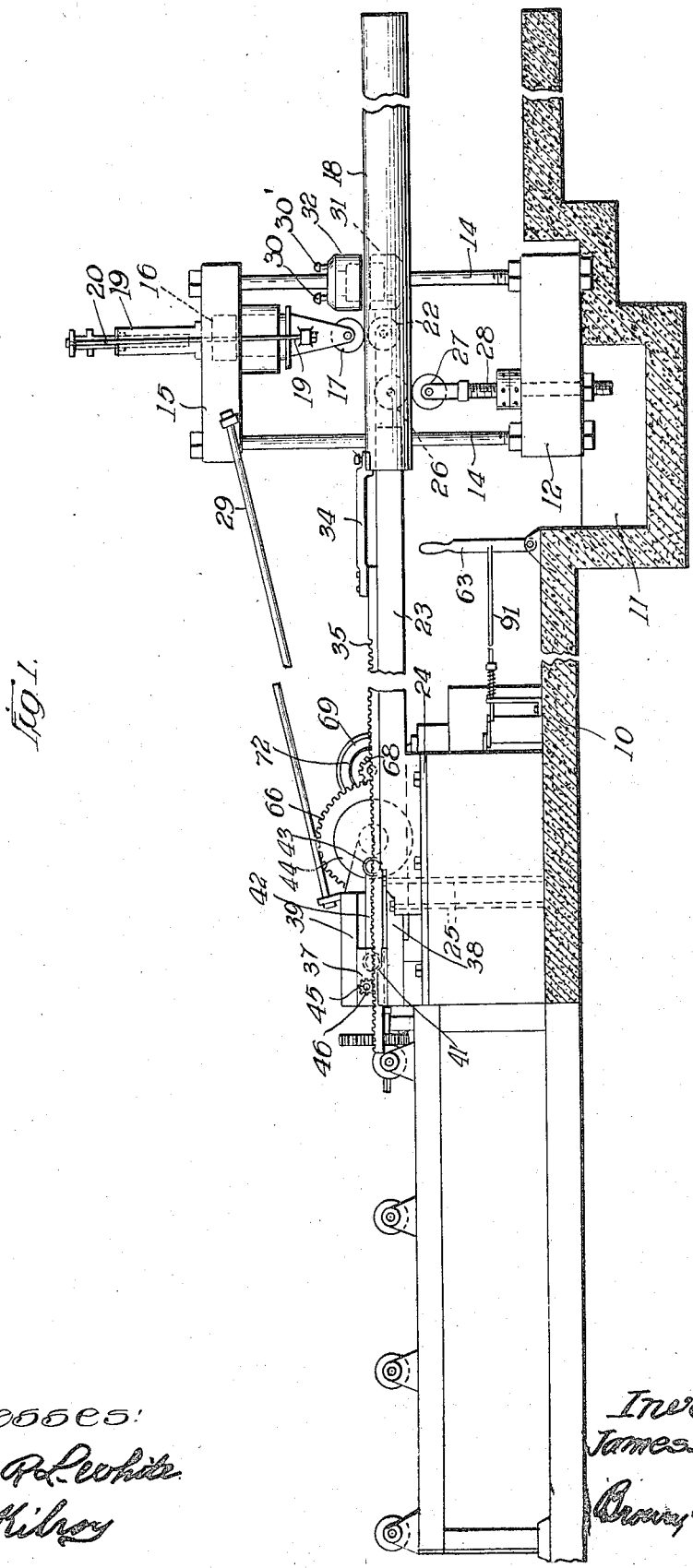

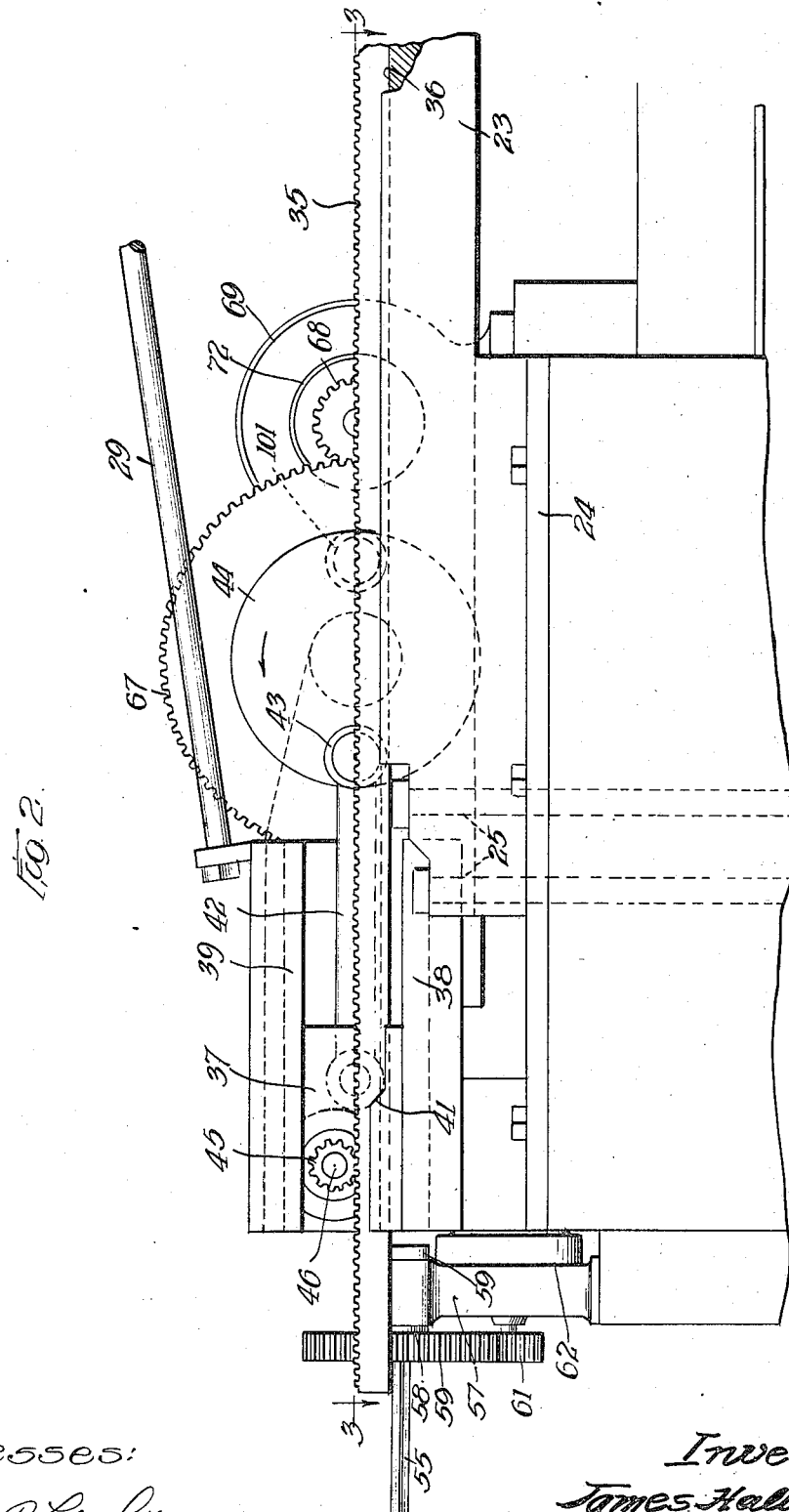

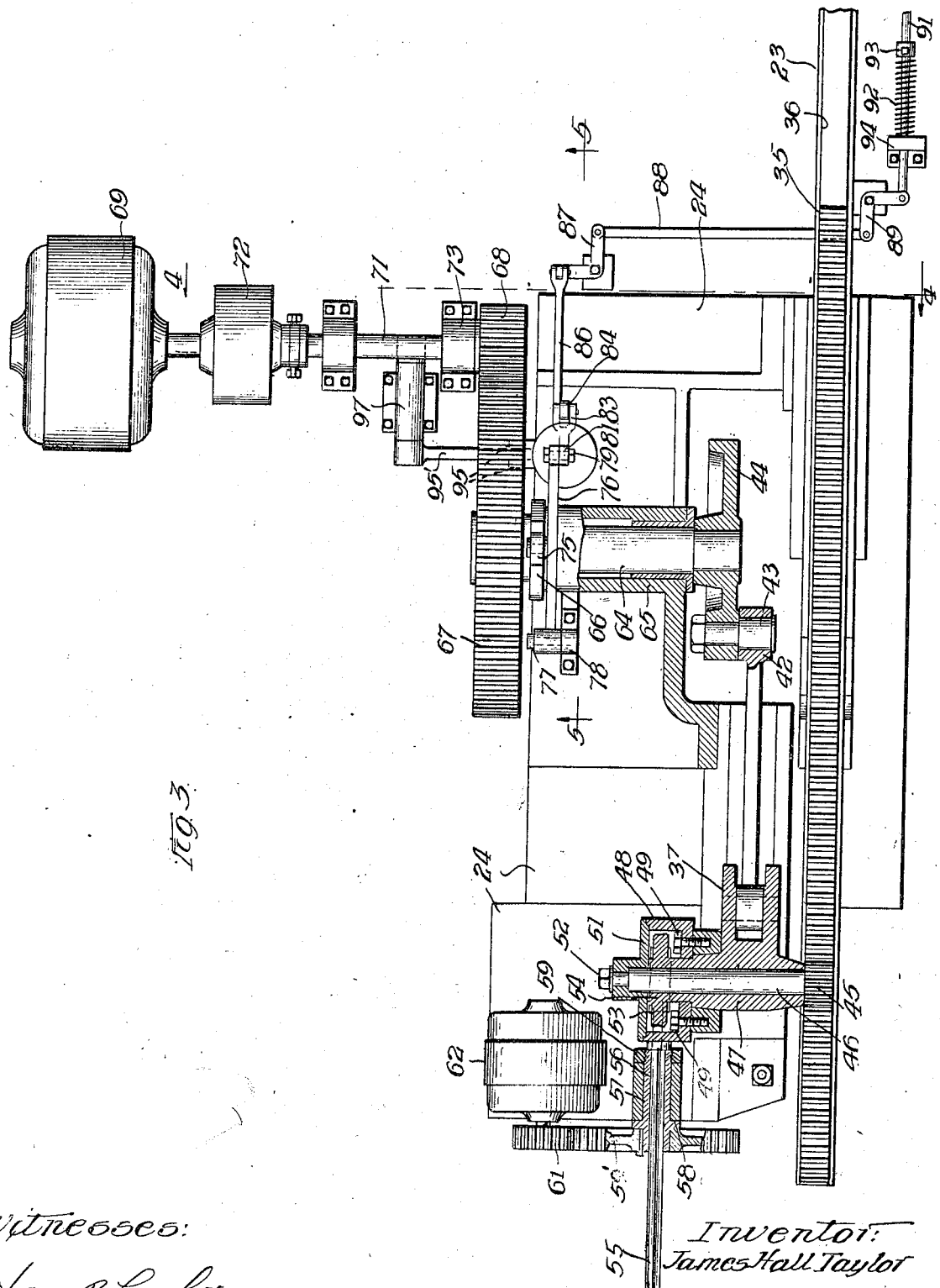

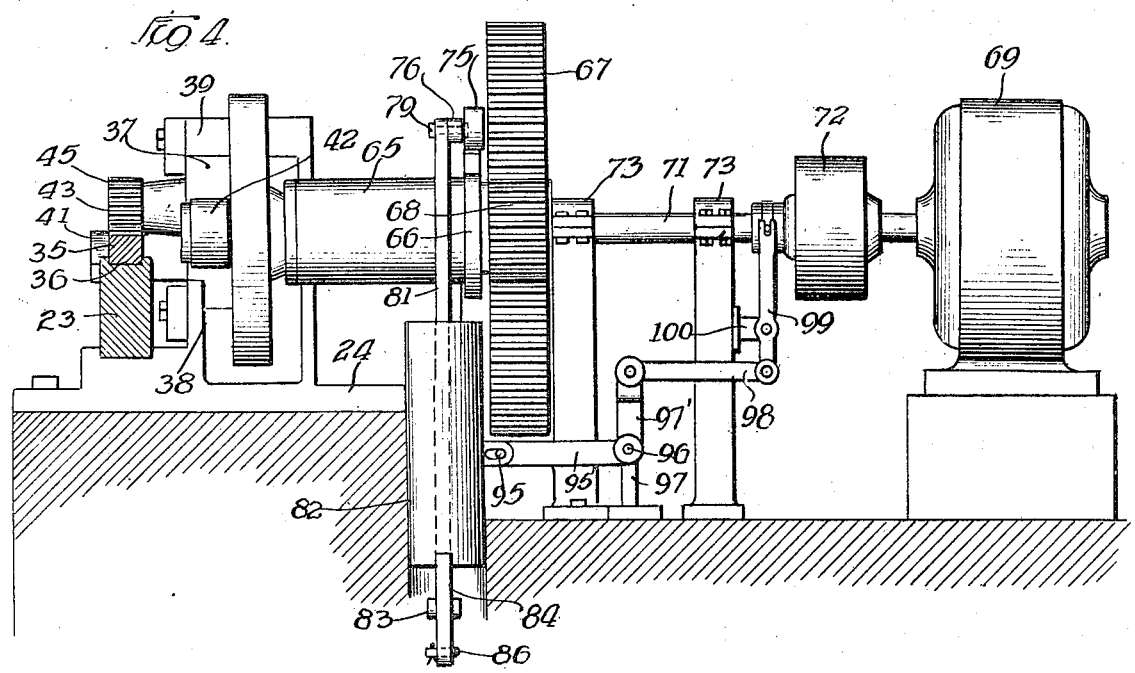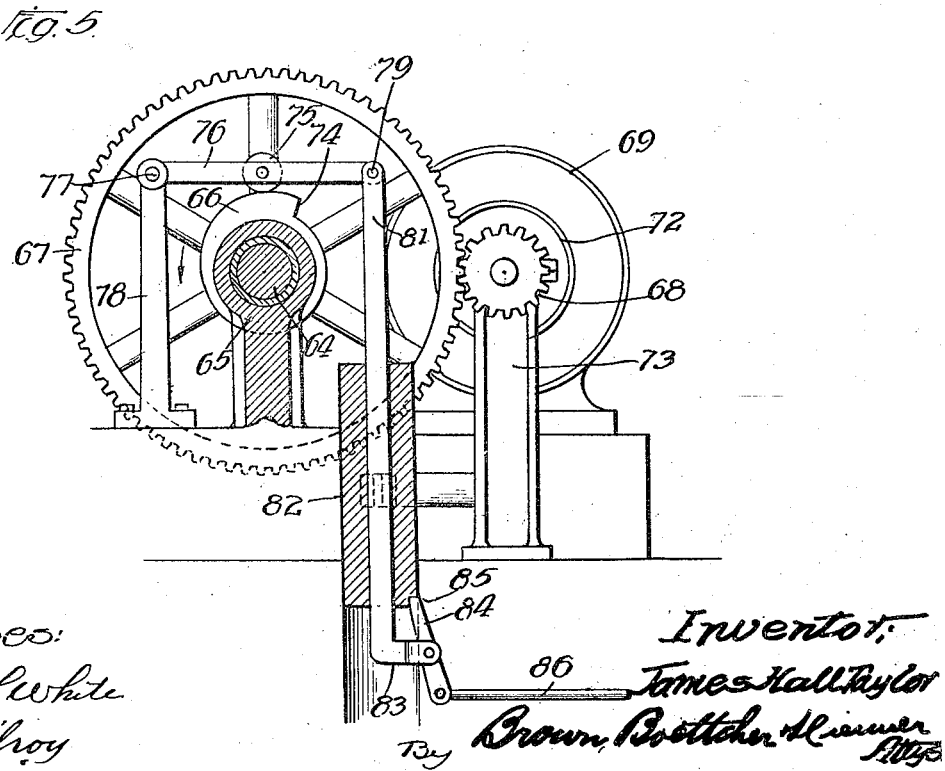

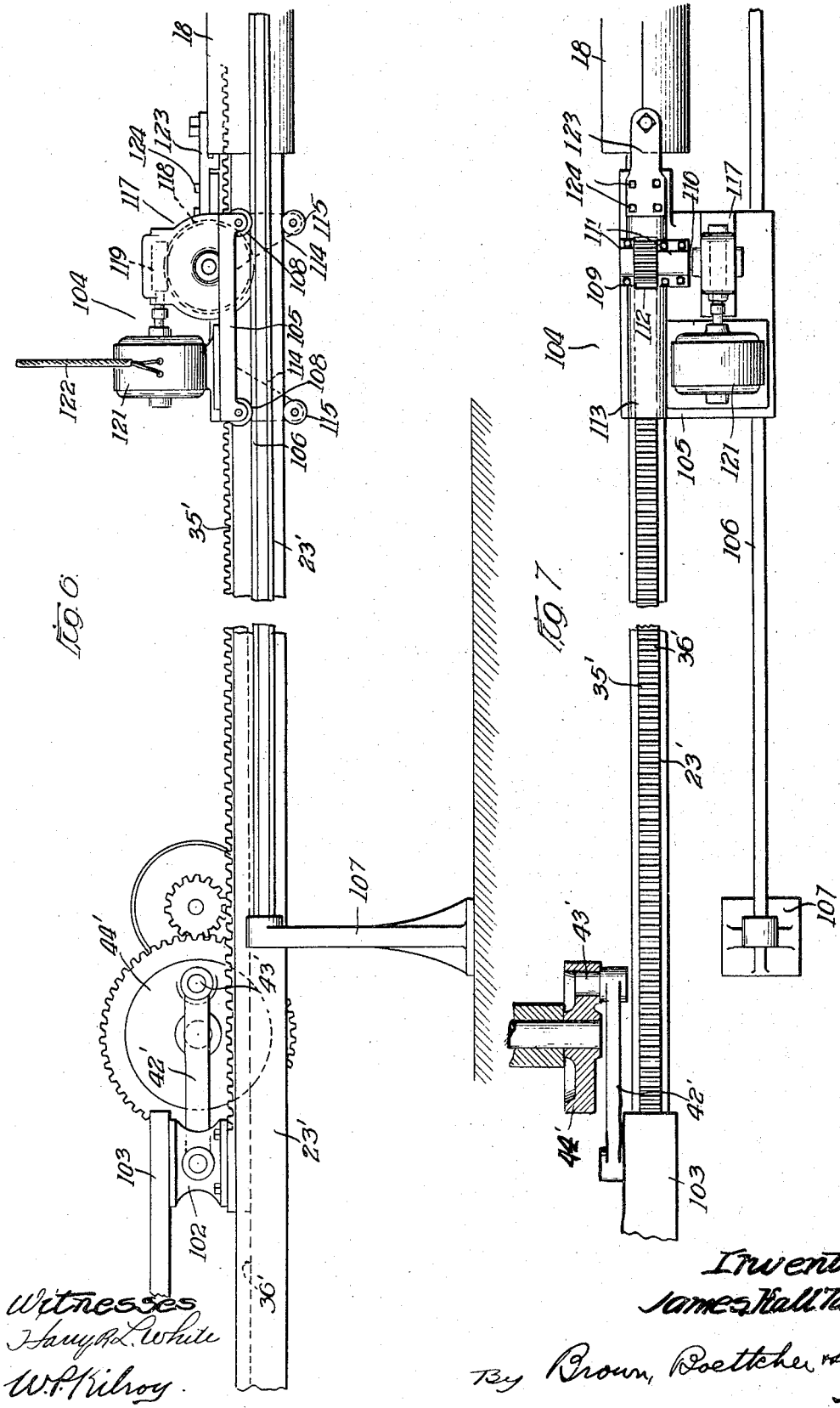

1,447,909

UNITED STATES PATENT OFFICE.

JAMES HALL TAYLOR, OF OAK PARK, ILLINOIS.

WELDING MACHINE.

Application filed September 30, 1920. Serial No. 413,684.

*To all whom it may concern:*

Be it known that I, JAMES HALL TAYLOR, a citizen of the United States, residing at Oak Park, in the county of Cook and State of Illinois, have invented a certain new and useful Improvement in Welding Machines, of which the following is a full, clear, concise, and exact description, reference being had to the accompanying drawings, forming a part of this specification.

My invention relates to welding machines, and has particular reference to machines for welding the longitudinal seams of tubes, pipes, plate metal cylinders and the like.

The present design of welding machine is of that class wherein the welding edges of the longitudinal seams are first subjected to a localized heating under the influence of suitable heating apparatus, the pipe or cylinder then being oscillated to bring the heated portion of the seam under the action of welding rolls or the like which exert a welding pressure upon the coacting heated portions of the seam. This method may be generally classed as "welding by intermittent process," as distinguished from welding by continuous process, wherein the section of pipe is first heated in its entirety and is then fed through the welding rolls in a continuous operation. The present heating and welding operation is performed progressively along the seam by intermittently reciprocating the pipe or cylinder between the heating apparatus and the welding mechanism through the intervention of a particular form of feeding mechanism. It is with this particular form of feeding mechanism that my invention is primarily concerned; the fundamental object of the invention being to provide an improved construction of feeding mechanism which will perform its operations of reciprocating and intermittently advancing the pipe or cylinder with maximum rapidity, and facility. In order that the commercial welding of pipe in large quantities in a machine of this character be economical and of low manufacturing cost, it is required that the pipe be handled with the greatest degree of celerity in the feeding operations so that a maximum proportion of the time required can be devoted to actual heating and welding operations, without loss of time and effort incident in the shifting and advancing operations. Heretofore, a prevalent practice has been to perform these feeding operations by hydraulic or pneumatic systems. In contra-distinction to this prior practice, the present form of feeding mechanism has been devised to be entirely mechanical in operation; the mechanical form of feeding mechanism permitting of a more rapid operation, a greater facility of control, and by reason of the fact that it dispenses with the necessity for hydraulic or compressed air installations it produces a simpler and more inexpensive construction. The hydraulic systems have the disadvantage of producing a continuously accelerating motion in the feeding operation, which results in the feeding mechanism and the pipe having the highest velocity of their travel at the end of the stroke, at which point the velocity should be at a minimum. This necessarily requires that a hydraulic system be operated at a comparatively low speed, otherwise the jar caused by suddenly stopping the large inertia of the feeding mechanism and the long section of pipe at the ends of the stroke is likely to rapidly deteriorate or even wreck the machine. The present form of mechanical feeding mechanism attains a maximum rapidity of operation by virtue of a particular feeding motion which first accelerates to a maximum in the intermediate portion of each stroke and then decelerates to a minimum at each end of each stroke. This is preferably, though not necessarily obtained through a crank mode of operation, the dead center areas of the crank corresponding to the positions of minimum velocity, and the intermediate portions of the crank throw corresponding to the positions of maximum velocity. By thus providing a feeding mechanism which will speed up the feeding operations incident in the intermittent welding process I am enabled to weld certain classes of material which have hitherto been difficult or impracticable to weld in the prior continuous welding or intermittent welding processes. For example, the welding of large tubing of thin material by the continuous welding process is impracticable because of the tendency of the tubing to collapse when heated in its entirety. Welding of this class of material in previous forms of intermittent welding machines has also been commercially impracticable because of the slowness of the feeding operations, which results primarily in the thin sectional thickness of the material losing the greater portion of its heat in traveling between the heating furnaces and the welding rolls, and which, secondarily, prohibits large scale production at a cost capable of competition with other methods by reason of the time consumed in the feeding operations. Heretofore, welding by the intermittent process has been practically entirely confined to the welding of heavy material and special articles because of the loss of time and heat during the feeding strokes. By reason of the celerity of the feeding operations and the facility of their control I am enabled to weld in the present machine large tubing of thin sectional thickness at a minimum cost, as well as work of heavy material and special constructions. The control mechanism of the present machine is so devised and related that the entire series of operations of the machine can be easily controlled by one operator.

The present mechanical adaptation of feeding mechanism preferably comprises a one cycle stop mechanism which automatically imparts a predetermined number of reciprocations in opposite directions to the pipe or other material to shift the latter back and forth between the heating and welding apparatus in performing the welding operation. This one cycle stop mechanism may be designed to produce one complete oscillation of the pipe from the heating furnaces to the welding rolls and back again, or it may be designed to produce a plurality of complete oscillations of the pipe in each cycle, both arrangements being within the purview of my invention and it being understood that the descriptive term "one cycle" is intended to include either one or more complete to and fro oscillations of the feeding mechanism. In the preferred embodiment this feeding mechanism imparts but a single oscillation to the pipe from the heating to the welding apparatus and back again, this oscillation being comparatively rapid to expedite the operation and avoid loss of heat during the transfer of the material from one apparatus to the other. Irrespective of whether the feeding mechanism is designed for a cycle of one reciprocation or a plurality of reciprocations, it is always possible to secure a larger number of continuous reciprocations than normally results by the proper manipulation of the controlling mechanism. Cooperating with this one cycle stop mechanism is a novel construction of advancing mechanism which is operable to intermittently advance or feed the pipe progressively through the machine as the welding operation continues. This advancing mechanism is arranged to be operable either independently of or simultaneously with the reciprocatory motion of the one cycle stop mechanism so that the intermittent feed of the pipe can be quickly and easily performed without interrupting or retarding the welding operation.

With this general description of the invention in mind, I shall now proceed to describe a preferred embodiment of the same, referring particularly to the accompanying drawings in which:

Figure 1 is a front elevational view of my improved welding machine, an intermediate portion of the machine being broken away to illustrate the same on a larger scale;

Figure 2 is an enlarged front elevational view of the reciprocating and advancing mechanism;

Figure 3 is a plan view of the same, parts being illustrated in section;

Figure 4 is a transverse sectional view taken approximately on the line 4—4 of Figure 3;

Figure 5 is a similar view taken on the plane of the line 5—5 of Figure 3;

Figure 6 is a fragmentary front elevational view of a modified construction of feeding mechanism; and Figure 7 is a plan view of the same.

The machine is preferably erected upon a concrete foundation 10 which is preferably formed with a pit or depression 11 in which is anchored a baseblock 12 for supporting the upper welding roll. Rising from the corners of this base block 12 are posts 14—14 which support a head member 15 at their upper ends in which is formed the hydraulic cylinder 16 for the overhead welding roll 17. This welding roll 17 is formed with a concave periphery of any desired curvature for engaging over the outside periphery of the pipe 18. The roll is pivotally carried in the bifurcated lower end of a piston or ram 19, which operates in the hydraulic cylinder 16. Fluid pipes extend from the hydraulic cylinder 16 to a source of fluid pressure and it will be apparent that by admitting this fluid pressure to the cylinder 16 a powerful welding pressure may be exerted by the roll 17 upon the longitudinal seam of the pipe 18. The piston 19 and welding roll 17 are returned to their raised position by a return hydraulic cylinder 20, the piston of which has operative connection with the piston 19 through rods 21. The welding pressure of the roll 17 is borne upon an inner welding roll 22 inside the pipe 18, this latter roll having a convex formation of periphery to conform to the inner periphery of the pipe 18. The inner roll 22 is pivotally supported in the end of a stationary horizontal bar 23 over which is adapted to pass the pipe 18 during the welding operation. The left hand end of the bar 23 is rigidly secured by bolts 25 upon the bed 24 which supports the reciprocating and advancing mechanism.

To relieve the bar 23 of the welding pressure exerted by the roll 17, there is provided a second inner roll 26 pivotally supported on the bar 23 within the pipe 18, which second roll is designed to cooperate with an outer roll 27 positioned directly below the roll 26 and outside of the pipe 18. The roll 26 is situated in close proximity to the roll 22, the two rolls being arranged whereby the outer roll 22 will bear against the upper part of the pipe periphery and receive the welding pressure along the line of the seam, and in turn transmit this welding pressure through the bar 23 to the rearward roll 26 which will bear against the lower periphery of the pipe and transmit the welding pressure to the outer roll 27. These rolls may be substituted by larger or smaller rolls, or other adjustments may be made, in order to accommodate different sizes of pipe blanks 18. The lower roll 27 is pivotally carried in a threaded post 28 which is adapted for vertical adjustment in the base block 12. A tie rod 29 connects the head 15 with the bed plate 24 and strengthens the head against the welding stresses.

Preliminary to feeding the pipe between the welding rolls 17 and 22 the longitudinal seam thereof is heated between inner and outer furnaces or heating burners 31 and 32. These burners are preferably supplied with a fuel gas which is adapted to highly heat the overlapping margins of the longitudinal pipe seam. The inner burner 31 is supported upon the end of the bar 23, being preferably supplied by gas through a gas conduit extending along side the bar 23. The outer burner 32 is supported between the corner posts 14 in any suitable manner and has any suitable connection with the air and gas supply, such as through the pipes 30—30. These burners may be substituted by larger or smaller sizes for accommodating different sizes of pipe blanks 18.

The section of pipe 18 is fed into the machine from the righthand end, being grasped by an arm 34 having at one end a claw or clamp which securely engages the end of the pipe section 18. This grasping arm 34 is rigidly carried on the end of a reciprocating rack bar 35 which slides in a channel-shaped groove 36 in the upper surface of the stationary bar 23. Referring particularly to Figures 2 and 3, it will be noted that the rack 35 extends from the lefthand end of the stationary bar 23 into a reciprocating cross-head 37. This cross-head reciprocates between ways 38 and 39 extending up from the bed plate 24; the lower portion of the cross-head which slides on the way 38 having a channel-shaped depression 41 formed in its upper surface for receiving the toothed rack 35. The cross-head 37 is reciprocated in the ways 38 and 39 through a connecting rod 42 which extends between the cross-head and a crank pin 43 on a crank wheel 44. The rack 35 is normally held in definite relation with the cross-head 37 so as to be reciprocated therewith by a pinion 45 which meshes in the teeth of the rack 35. As clearly shown in Figure 3, the pinion 45 is mounted upon the end of a horizontal driving shaft 46 which extends through a transverse hub 47 formed integral with the cross-head 37. The other end of the shaft 46 extends into a gear housing 48 which is secured to the body of the cross-head 37 by cap screws 49. The end of the shaft 46 extends into a bearing hub on the cover plate 51 which closes off the front of the gear housing 48, a nut 52 threading over a reduced extension of the shaft outside of said bearing hub. Rigidly mounted on the shaft 46 within the gear housing 48 is a worm wheel 53. The worm wheel 53 meshes with a driving worm, indicated in dotted lines at 54, which is mounted on a horizontal shaft 55 having bearing support in the walls of the gear housing 48. The pitch of the worm wheel 53 and worm 54 is such that the worm wheel 53 is irreversible in the sense that the pinion 45 can not drive back through the worm wheel 53, although the worm wheel is of course operable to drive the pinion in either direction. Hence it will be seen that in the normal reciprocation of the cross-head 37 the pinion 45 will remain locked in the teeth of the rack 35 by reason of the inability of the pinion to drive back through the worm wheel 53. From the gear housing 48 the shaft 55 extends into a sleeve 56 which has journal support in a stationary bearing hub 57 rising from the bed plate 24. The shaft 55 is of square section and slides in a correspondingly formed opening in the sleeve 56, whereby the to and fro reciprocation of the shaft 55 is permitted while still maintaining a driving connection between the sleeve 56 and the shaft. The sleeve 56 is held against shifting motion in the bearing hub 57 by a collar 58 at one end and a nut 59 threading over the other end of the sleeve. Rigidly keyed to the end of the sleeve 56 is a large spur gear 59', which meshes with a pinion 61 on the shaft of an electric motor 62, mounted on the bed plate 24. The circuit connections for the motor 62 include a switch or other control unit which is located substantially at the position occupied by the operator controlling the machine, so that the operation of the motor 62 can be readily and conveniently controlled. This operating position is preferably in proximity to the heating and welding apparatus, as represented by the operating handle 63 for controlling the reciprocating or one cycle stop mechanism. As a result of the above arrangement, energization of the electric motor 62 will operate to slowly revolve the pinion 45 and advance the rack 35 to the left, relative to the cross-head 37. It will be observed that by virtue of the sliding connection between the shaft 55 and the sleeve 56 this advancement of the rack 35 may occur with the cross-head 37 in motion or at rest.

Referring now to the construction of the one cycle stop mechanism for reciprocating the pipe 18 between the heating and welding apparatus, it will be observed from Figure 3 that the crank wheel 44 is mounted upon a horizontal driving shaft 64 which has bearing support in a bearing 65 rising from the bed plate 24. At the rear end of the bearing 65 the shaft 64 carries a cam 66 and spur gear 67. The gear wheel 67 is adapted to be driven at reduced speed by a pinion 68 which is driven from an electric motor 69 through a shaft 71. A releasing clutch 72 is interposed between the shaft of the motor 69 and the pinion shaft 71 for the purpose of controlling the moment of engagement and the interval of drive between the constantly running electric motor 69 and the pinion shaft 71. The pinion shaft 71 has journal support at one end in the clutch 72 and has bearing support adjacent the pinion 68 in one or more pedestal bearings 73. As will be seen from Figure 5, the cam 66 on the driving shaft 64 is of snail pattern, having a substantially square drop-off shoulder 74. Co-operating with this cam 66 is a roller 75 which has pivotal support in a horizontal arm 76. One end of the arm 76 has pivotal connection at 77 with a stationary column 78 rising from the foundation bed, while the other end of the arm has pivotal connection at 79 with a vertically reciprocable rod 81. The vertical rod 81 functions to restore a cylindrical tripping weight 82 which controls the position of the clutch 72 and which is mounted for sliding motion along the lower portion of the rod 81. The lower end of the rod 81 is formed with a laterally bent extension 83 which is bifurcated for the reception of a pivotally mounted dog or pawl 84. When the rod 81 is to restore the tripping weight 82 to its elevated position the nose of the pawl 84 is adapted to engage in a shouldered notch 85 cut in the lower edge of the weight 82. The lower end of the tripping pawl 84 has pivotal connection with an operating rod 86 which extends to one arm of a bell-crank lever 87 (Figure 3). Here the rod 86 has pivotal connection with the bell-crank arm on a horizontal axis so as to allow for the raising and lowering of the restoring rod 81. From the other arm of the bell-crank 87 extends a rod 88 which reaches forwardly to the front of the machine where it has pivotal connection with one arm of a second bell-crank lever 89. From the other arm of this bell crank lever extends a rod 91 which has operative connection with the control lever 63 at the operator's position. A compression spring 92 which is confined between a collar 93 on the rod 91 and a bracket 94 normally tends to retain the control lever 63 in the position illustrated with the nose of the tripping pawl 84 tending to engage or remain engaged in the shouldered notch 85 in the weight 82. As shown best in Figure 4, the weight 82 is formed with a pair of spaced lugs 95 between which is pivoted a lever arm 95′. This lever arm is mounted on a short shaft 96 which has bearing support in a horizontal bearing bracket 97. To the other end of the shaft 96 is secured a lever arm 97′ which has pivotal connection through a link 98 with a shifting or actuating fork 99 for controlling the position of the clutch 72. The fork 99 has pivotal support on a bracket 100 extending from the pedestal bearing 73, or is mounted in any other suitable manner.

The operation of the machine is as follows:

When the portion of the overlapping longitudinal seam of the pipe subjected to the heating action of the furnaces 31 and 32 has reached the desired temperature for welding, the operator trips the one cycle stop mechanism by moving the control lever 63 to the left. This motion of the control lever trips the nose of the pawl 84 out of the shouldered notch 85 and allows the weight 82 to drop down. This results in the oscillation of the shaft 96 with a concurrent actuation of the shifting fork 99 whereby the clutch 72 is engaged and the constantly running electric motor 69 starts to drive the pinion 68. This revolves the large spur gear 67 in a counter clockwise direction which operates through the shaft 64 to revolve the crank wheel 44 and oscillate the cross-head 37. Normally the crank pin 43 occupies the position indicated in dotted lines at 101 (Figure 2), and it will thus be apparent that the rotation of the crank wheel, as indicated by the arrow, will, during the first half revolution, reciprocate the crosshead 37 to the extreme left-hand position illustrated in full lines. This reciprocation of the cross-head will, through the instrumentality of the irreversible pinion 45, impart a reciprocating stroke to the rack 35 to the left, thereby withdrawing the heated portion of the pipe seam from between the heaters 31 and 32 and subjecting it to the welding pressure of the rolls 17 and 22. The throw of the crank is comparatively rapid so that there will be a minimum time interval for the heated portion of the seam to cool off before reaching the welding rolls, but it will be noted that notwithstanding the rapidity of the throw the acceleration and deceleration are gradual and without shock as a result of the characteristic motion of the crank. With the continued rotation of the crank wheel 44 the cross-head 37 will start back on its return throw, thereby thrusting the portion of pipe steam previously subjected to the action of the welding rolls back between the heating burners 31 and 32 for a secondary heating preparatory to a second welding operation between the rolls 17 and 22. It is sometimes desirable to make a second reciprocation of the welded portion of the seam between the welding rolls for the purpose of polishing the surface of the weld. During the initial part of the rotation of the crank wheel 44 the cam shoulder 74 revolves past the cam roller 75, whereupon the arm 76 and restoring rod 81 drop to their lowermost position, at which position the nose of the pawl 84 relatches itself in the notch 85 under the action of the spring 92—the control lever 63 having been released immediately after its actuating impulse. During the return throw of the crank-pin 44 to the right the high part of the snail cam 66 rides up under the cam roller 75, and when the crank pin reaches approximately the dotted line position 101 the snail cam 66 becomes effective by raising the weight 82 through the intervention of the pawl 84 and thus releases the clutch 72. With the disengagement of the clutch the rotation of the crank wheel and oscillation of the cross-head automatically ceases. A second single-stroke reciprocation of the pipe 18 for repeating the welding operation or for polishing the weld is effected by again actuating the control handle 63, whereupon the above cycle is repeated. If a series of continuous reciprocations of the pipe are desired the control lever 63 is merely held in tripping position; which retains the pawl 84 in an inoperative position and consequently the vertical oscillation of the restoring rod 81 is ineffective for restoring the tripping weight 82 until the control lever 63 is released. The foregoing operation is descriptive of a one cycle stop mechanism designed for producing a single to and fro reciprocation of the pipe. As I have hereinbefore remarked, however, I also contemplate designing this one cycle stop mechanism to produce two or more back and forth reciprocations; this being accomplished, for example, by driving the cam 66 at a lower rate of rotation than the crank wheel 44, such as through the intervention of suitable speed reducing gearing connecting the shaft 46 and the cam 66.

As each portion of the pipe seam is completely welded, the pipe is intermittently advanced toward the left to expose new portions of the seam to the welding operation. As hereinbefore described, this is accomplished through the control of the electric motor 62. Energization of this motor may be intermittent and in accordance with the rapidity of the welding operation so as to bring new portions of the pipe seam under the influence of the heating burners at the proper time, or, under certain circumstances, the motor may be run continuously at a slow rate for slowly advancing the pipe between the welding rolls.

In Figures 6 and 7 I have illustrated a modified construction of feeding mechanism comprising substantially the same principles of feeding motion and operation but embodied in a somewhat different structure. In this embodiment the anvil bar 23' and the rack 35' are so aligned with respect to the welding rolls that the pipe 18 can be drawn over the anvil bar and rack in the feeding operations. As in the previous construction, the rack 35' reciprocates in a channel-shaped groove 36' in the top of the anvil bar 23', but in this instance the rack 35' is reciprocated by direct connection with the connecting rod 42' through a cross-head 102 which is bolted rigidly to the end of the rack. The reciprocating motion of the cross-head is guided between the channel-shaped groove 36' in the anvil bar 23' and an upper guide 103. The crank wheel 44' is given a predetermined angular roll of one or more revolutions through the intervention of a one cycle stop mechanism similar to that previously described.

The pipe 18 is adapted to be mechanically coupled to the rack 35' through the instrumentality of a motor carriage 104 which is operable to traverse the length of the rack 35'. This motor carriage comprises a carriage bed 105 which rests at one side on the rack bar 35' and at the other side has rolling support along a rail 106.

The rail 106 has elevated support between two end standards 107 which support the rail parallel with the anvil bar 23'; the carriage bed 105 having side rollers 108 at its ends which track upon this rail 106 and support the side of the carriage bed. A pinion 109, mounted on a transverse shaft 110 having bearing support in bearings 111 on the carriage bed, extends through a slot 112 in the carriage bed and meshes with the teeth of the rack 35'. The mesh of this pinion in the teeth of the rack 35' supports this side of the carriage bed above the rack, the bed being raised at 113 to clear the rack. To hold the pinion 109 in the teeth of the rack 35' against the radial thrusts developed in the advancing operations, this side of the motor carriage is provided with two depending side arms 114, supporting rollers 115 which track along the bottom of the anvil bar 23' and prevent this side of the carriage from raising. The pinion shaft 110 extends into a gear housing 117 where it carries a worm wheel 118. Meshing with the worm wheel 118 is a worm 119, the shaft of which is extended out through the casing 117 to be coupled with the shaft of an electric motor 121. The motor 121 is supplied with current through a flexible drop cable 122 which hangs from an elevated point to permit the back and forth traversing motion of the motor carriage. The motor carriage 104 is adapted to be rigidly coupled to the end of the pipe 18 through a jaw clamp 123 or the like, which is bolted or otherwise secured to the motor carriage as indicated at 124.

In the operation of this embodiment it will be apparent that the motor carriage 104 will reciprocate with the reciprocatory motion of the rack bar 35' by reason of the fact that the pinion 109 is inoperable to drive back through the system of work gearing 118—119, and consequently the pipe 18 will be reciprocated through the intervention of the motor carriage, in exactly the manner described of the previous embodiment. When it is desired to advance a succeeding portion of the pipe seam to the heating furnaces, the motor 121 is energized with the resulting rotation of the pinion 109 which slowly traverses the motor carriage along the rack bar 35' and thus draws a successive portion of the pipe into welding position. Obviously, the advancing motion of the motor carriage 104 may take place while the rack 35' is in reciprocatory motion, or is at rest.

I do not intend to be limited to the specific details herein shown and described, except as they are defined in the appended claims.

I claim:

1. In a welding machine, the combination of heating apparatus for heating the work to be welded, welding surfaces between which the heated work is welded, and a one cycle stop mechanism operable to move the work between said heating apparatus and said welding surfaces.

2. In a welding machine, the combination of heating apparatus for heating the work, welding surfaces between which the heated work is welded, and feeding mechanism comprising mechanical reciprocatory means for reciprocating the work between said heating apparatus and said welding surfaces, and advancing mechanism cooperating with said reciprocatory means operable to advance the work with the welding operation.

3. In a welding machine, the combination of heating apparatus for heating the work, welding surfaces between which the heated work is welded, and reciprocatory feeding means comprising a one cycle stop mechanism operable to reciprocate the work between said heating apparatus and said welding surfaces and to automatically return the same.

4. In a welding machine, the combination of heating apparatus for heating the work, welding apparatus for welding the heated work, and feeding means comprising a mechanical reciprocatory mechanism for reciprocating the work between said heating and welding apparatus, and independently operable advancing mechanism for feeding successive portions of the work to said heating and welding apparatus.

5. In a welding machine, the combination of heating apparatus for heating the work, welding apparatus for welding the work after heating, and feeding means comprising a reciprocating mechanism for reciprocating the work between said heating and welding apparatus, and advancing mechanism operable simultaneously with or independently of said reciprocating mechanism for feeding successive portions of the work to said apparatus.

6. In a welding machine, the combination of heating apparatus for heating the pipe or other work, welding apparatus for welding the pipe, a mechanically operating single-stroke mechanism functioning to reciprocate the pipe from said heating apparatus to said welding apparatus and to automatically return the same, and manually controlled advancing mechanism for intermittently or continuously advancing successive portions of said pipe to said heating apparatus.

7. In a welding machine, the combination of heating apparatus for heating the pipe, welding apparatus for welding the pipe, reciprocating mechanism for reciprocating the pipe between said heating and welding apparatus, said reciprocating mechanism comprising a crank member moving through a complete cycle of angular motion and imparting corresponding motion to the pipe, and clutch mechanism adapted to be controlled by the operator for controlling the duration or degree of movement of said crank member.

8. In a welding machine, the combination of heating apparatus for heating the pipe, welding apparatus for welding the pipe, reciprocating mechanism for reciprocating the pipe between said heating and welding apparatus, said reciprocating mechanism comprising a crank member, means adapted to operatively connect said crank member with the pipe, a manual operating member, and means controlled by said manual operating member for revolving said crank member through a predetermined angular motion.

9. In a welding machine, the combination of heating apparatus for heating the pipe, welding apparatus for welding the heated pipe, reciprocating mechanism for moving the pipe between said heating and welding apparatus, said reciprocating mechanism comprising a crank member, a reciprocating cross-head connected to said crank member, means adapted to connect the pipe with said cross-head, driving means for said crank member, a manual operating member, and means controlled by said manual operating member for operatively connecting said driving means with said crank member for rotating the latter through a predetermined degree of angular travel.

10. In a welding machine, the combination of heating apparatus for heating the pipe seam, a pair of welding rolls between which the pipe seam is welded, reciprocating mechanism for reciprocating the pipe from said heating apparatus to said welding rolls, said reciprocating mechanism comprising a crank member, a cross-head operatively connected to said crank member, a rack reciprocated by said cross-head, means adapted to connect said rack with the section of pipe, driving means for said crank member, a manual operating member, single-stroke mechanism adapted to be tripped by said manual operating member and operative to connect said driving means with said crank member for rotating the latter through a complete revolution, and advancing mechanism cooperating with said rack for advancing the pipe relative to said cross-head.

11. In a welding machine, the combination of heating apparatus for heating the work, welding apparatus for welding the work, a rack for moving the work from said heating apparatus to said welding apparatus, means for imparting motion to said rack for performing the welding operation, and means for cooperating with said rack and having motion relative thereto for advancing successive portions of the work to said apparatus.

12. In a welding machine, the combination of heating apparatus for heating the pipe, welding apparatus for welding the heated pipe, a rack for reciprocating the pipe between said heating and welding apparatus, means for imparting a reciprocating motion to said rack for performing the welding operation, and means cooperating with said rack for imparting an advancing motion to the pipe independently of said reciprocating motion for advancing successive portions of the pipe to said heating and welding apparatus.

13. In a welding machine, the combination of heating apparatus for heating the pipe seam, welding apparatus for welding the heated pipe seam, a rack adapted to have operative connection with the pipe for reciprocating the latter between said heating and welding apparatus, a cross-head, a pinion carried by said cross-head meshing with said rack, means for reciprocating said cross-head, and means for driving said pinion for advancing said rack.

14. In a welding machine, the combination of heating apparatus for heating the pipe seam, a pair of welding rolls between which the heated seam is welded, a rack adapted to have operative connection with the pipe for reciprocating the latter between said heating and welding apparatus, a cross-head, a gear carried by said cross-head meshing with said rack, said gear normally locking said cross-head to said rack, a crank member for reciprocating said cross-head, driving means for said crank member, a manual operating member, a single-stroke mechanism tripped by said manual operating member and operating to connect said driving means with said crank member for driving said crank member through a complete revolution and means operable simultaneously with or independently of said cross-head for driving said gear.

15. In a welding machine, the combination of heating apparatus for heating the longitudinal pipe seam, a pair of welding rolls between which the pipe seam is adapted to be drawn after heating, a rack adapted to have operative connection with the pipe section for reciprocating the latter, a cross-head, means for reciprocating said cross-head, a shaft carried in said cross-head, a pinion on said shaft meshing with said rack, power means for driving said shaft, and irreversible gearing connecting said power means with said shaft.

16. In a welding machine, the combination of heating apparatus for heating the pipe, welding apparatus for welding the pipe, a rack adapted to have operative connection with the section of pipe for reciprocating the latter, a cross-head, a shaft carried in said cross-head, a pinion on said shaft meshing with said rack, a single stroke mechanism for reciprocating said cross-head through a single complete reciprocation, driving means comprising a system of irreversible gearing for driving the shaft in said cross-head, a source of power connected to said driving means, said driving means permitting reciprocating motion of said cross-head relative to said source of power.

17. In a pipe welding machine, the combination of inner and outer heating burners between which the longitudinal pipe seam is adapted to be drawn, inner and outer welding rolls adapted to receive the heated portion of pipe seam from said heating burners, a reciprocating toothed rack, means connecting said rack with the section of pipe, a cross-head reciprocating in ways, a shaft mounted in said cross-head, a pinion on said shaft meshing with said rack, a crank pin, and a connecting rod between said crank pin and said cross-head, a source of power for driving said crank pin, a clutch between said source of power and said crank pin, a single stroke mechanism controlling said clutch, a manual operating member for tripping said single stroke mechanism, said clutch being thereby engaged and released automatically to transmit a single substantially complete revolution to said crank pin, a worm wheel on the shaft in said cross head, a worm meshing with said worm wheel, and an independent source of power operable to drive said worm.

18. In a welding machine, the combination of a stationary bar, a welding roll pivotally supported on said bar and adapted to engage the inner side of the longitudinal pipe seam, an outer welding roll cooperating with said inner roll and engaging the outer side of said longitudinal seam, a fluid pressure cylinder for exerting a welding pressure on said outer roll, heating apparatus for heating the pipe seam, a second inner roll pivotally supported on said bar adjacent said first inner roll, said inner rolls being offset laterally along the length of said bar relative to each other, said second inner roll engaging the inner circumference of the pipe at a point opposite the pipe seam, and an outer reaction roll engaging with the outer periphery of the pipe coincident with said second inner roll, said outer reaction roll receiving substantially the welding pressure exerted on said outer welding roll.

19. In a welding machine, the combination of heating apparatus for heating the work, welding apparatus for welding the work, reciprocatory mechanism for producing a relative reciprocating motion between the work and said heating and said welding apparatus, said reciprocatory mechanism imparting a gradually accelerating and decelerating motion to the movable element, and clutch mechanism controlling said reciprocatory mechanism.

20. In a welding machine, the combination of heating apparatus for heating the work, welding apparatus for welding the work, reciprocating mechanism for producing a reciprocating motion of the work between said heating and welding apparatus, said reciprocating mechanism comprising means for producing a maximum velocity of stroke in the intermediate portion of the reciprocation with a gradual acceleration and deceleration at the limits of the stroke, and clutch mechanism actuated by the operator for controlling said reciprocating mechanism.

21. In a welding machine, the combination of heating apparatus for heating the work, welding apparatus for welding the work, and one cycle stop mechanism operable to automatically reciprocate a predetermined portion of the work from said heating apparatus to said welding apparatus and back again through a number of reciprocations.

22. In a welding machine, the combination of heating apparatus for heating the pipe, welding apparatus for welding the pipe, reciprocating mechanism adapted to have connection with the pipe for reciprocating the latter from said heating apparatus to said welding apparatus and back again, said reciprocating mechanism having a gradually accelerating and decelerating motion at the limits of its stroke, and one cycle stop mechanism operable to automatically control the number of reciprocating impulses of said reciprocating mechanism.

23. In a welding machine, the combination of an anvil bar, a pair of welding rolls, one of said rolls being supported by said anvil bar, a pair of heating burners for heating the pipe seam preparatory to drawing the same between said welding rolls, a rack bar associated with said anvil bar and adapted to have connection with the pipe means for imparting a reciprocating motion to said rack, said motion having a gradually accelerating and decelerating characteristic, and means cooperating with said rack for periodically or continuously advancing said rack for advancing the pipe over said anvil bar and bringing successive portions of the pipe seam into welding position.

24. In a welding machine, the combination of a stationary bar, a pair of welding rolls, one of said rolls being supported by said stationary bar, a pair of heating burners for heating the pipe seam preparatory to welding the same, one of said burners being supported by said stationary bar, a rack adapted for sliding motion along said stationary bar, said rack being operative to reciprocate the pipe between the heating burners and the welding rolls, a cross-head having connection with said rack, a crank connecting with said cross-head for reciprocating the latter, a one cycle stop mechanism for automatically revolving said crank through a definite degree of angular rotation, and means cooperating with said rack for advancing the pipe and bringing successive portions of the pipe seam into welding position, said pipe being drawn over said stationary bar in its progressive reciprocating and advancing motions.

25. In a welding machine, the combination of heating apparatus for the pipe, welding apparatus for welding the pipe, a rack operative to reciprocate the pipe between said heating and welding apparatus, and means traversing said rack for advancing the pipe and bringing successive portions of the pipe seam into welding position.

26. In a welding machine, the combination of heating apparatus for heating the pipe, welding apparatus for welding the pipe, a rack operative to reciprocate the pipe between said heating apparatus and said welding apparatus, a power-driven carriage having traversing motion along said rack and means connecting said carriage with the pipe for progressively reciprocating and advancing the latter between said heating and welding apparatus.

27. In a welding machine, the combination of heating apparatus for heating the pipe, welding apparatus for welding the pipe, a reciprocating rack, a cross-head connected to said rack, a crank for reciprocating said cross-head, a one cycle stop mechanism for automatically imparting a predetermined degree of angular throw to said crank, a motor carriage having a motor driven gear meshing in said rack and operable to traverse said rack from end to end, and means adapted to connect said motor carriage with the pipe for progressively reciprocating and advancing the latter.

28. In a welding machine, the combination of heating apparatus for heating the work to be welded, welding surfaces between which the heated work is welded, mechanism operable to move the work between said heating apparatus and said welding surfaces, and independent mechanism for producing a relative feeding motion between the work and said heating and welding apparatus for feeding successive portions of the work thereto.

In witness whereof I hereunto subscribe my name this 24th day of September, 1920.

JAMES HALL TAYLOR.